US010033233B2

(12) United States Patent
Fahimi et al.

(10) Patent No.: US 10,033,233 B2
(45) Date of Patent: Jul. 24, 2018

(54) DOUBLE SALIENCY EXTERIOR ROTOR SWITCHED RELUCTANCE MACHINE WITH INCREASING AND DECREASING FLUX LINKAGES AND PERMANENT MAGNETS

(71) Applicant: The Board of Regents, The University of Texas System, Austin, TX (US)

(72) Inventors: Babak Fahimi, Arlington, TX (US); Wei Wang, Dallas, TX (US); Chenjie Lin, Raleigh, NC (US)

(73) Assignee: The Board of Regents, The University of Texas System, Austin, TX (US)

( * ) Notice: Subject to any disclaimer, the term of this patent is extended or adjusted under 35 U.S.C. 154(b) by 800 days.

(21) Appl. No.: 14/318,115

(22) Filed: Jun. 27, 2014

(65) Prior Publication Data

US 2015/0002063 A1    Jan. 1, 2015

Related U.S. Application Data

(63) Continuation-in-part of application No. 13/169,233, filed on Jun. 27, 2011.
(Continued)

(51) Int. Cl.
*H02K 1/00* (2006.01)
*H02K 1/24* (2006.01)
(Continued)

(52) U.S. Cl.
CPC ............... *H02K 1/246* (2013.01); *H02K 1/08* (2013.01); *H02K 19/103* (2013.01); *H02K 19/24* (2013.01);
(Continued)

(58) Field of Classification Search
CPC .......... H02K 1/246; H02K 1/24; H02K 19/24; H02K 19/103; H02K 19/1036;
(Continued)

(56) References Cited

U.S. PATENT DOCUMENTS 3,956,678 A * 5/1976 Byrne ..................... H02K 1/246
310/168
4,698,537 A * 10/1987 Byrne ..................... H02K 1/246
310/168
(Continued)

OTHER PUBLICATIONS

Mohammadali Abbasian, et al., "Double-Stator Switched Reluctance Machines (DSSRM): Fundamentals and Magnetic Force Analysis," IEEE Transactions on Energy Conversion, Sep. 2010, pp. 589-597, vol. 25, No. 3.

*Primary Examiner* — Bernard Rojas
*Assistant Examiner* — Maged Almawri
(74) *Attorney, Agent, or Firm* — Schultz & Associates, P.C.

(57) ABSTRACT

An exterior rotor switched reluctance machine includes a stator, a rotor adjacent the stator and adjacent a housing, the housing connected to the stator. The stator further includes a back iron, a set of stator poles connected to the back iron and a set of windings disposed between the set of stator poles. The rotor, connected to a shaft and rotatively coupled to the stator, further includes a set of rotor segments. The set of windings includes a set of phases, each phase experiencing a flux linkage that varies with an angular position of the rotor. The apparatus operates as a motor in response to selectively energizing the set of phases with a set of current pulses. The apparatus operates as a generator in response to rotating the shaft.

4 Claims, 9 Drawing Sheets

Related U.S. Application Data

(60) Provisional application No. 61/840,949, filed on Jun. 28, 2013, provisional application No. 61/358,583, filed on Jun. 25, 2010.

(51) Int. Cl.
| | | |
|---|---|---|
| *H02K 21/22* | (2006.01) | |
| *H02K 19/24* | (2006.01) | |
| *H02K 1/08* | (2006.01) | |
| *H02K 19/10* | (2006.01) | |
| *H02P 25/092* | (2016.01) | |
| *H02K 5/04* | (2006.01) | |
| *H02K 1/18* | (2006.01) | |

(52) U.S. Cl.
CPC ......... *H02K 21/22* (2013.01); *H02P 25/0925* (2016.02); *H02K 1/187* (2013.01); *H02K 5/04* (2013.01); *H02K 2213/03* (2013.01)

(58) Field of Classification Search
CPC ........ H02K 19/10; H02K 19/20; H02K 21/22; H02K 5/04; H02K 2213/03; H02K 1/187; H02K 1/08; H02P 25/092; H02P 25/0925; H02P 8/04; H02P 8/24; H02P 8/00
USPC ............ 310/216.107, 216.075, 12.18, 12.19, 310/49.43, 106, 156.48, 49.01, 184, 310/12.17, 168, 490.1; 318/700
See application file for complete search history.

(56) References Cited

U.S. PATENT DOCUMENTS

| | | | | |
|---|---|---|---|---|
| 4,757,224 A * | 7/1988 | McGee | ................ | H02K 19/24 310/111 |
| 5,081,388 A | 1/1992 | Chen | | |
| 5,111,096 A * | 5/1992 | Horst | ................ | H02K 1/24 29/596 |
| 5,113,113 A * | 5/1992 | Tepavcevic | .......... | H02K 19/103 318/400.17 |
| 5,304,882 A | 4/1994 | Lipo et al. | | |
| 5,345,133 A | 9/1994 | Satake | | |
| 5,537,019 A * | 7/1996 | Van Sistine | .............. | H02P 6/185 318/400.13 |
| 5,545,938 A * | 8/1996 | Mecrow | .................... | H02K 3/18 310/156.64 |
| 5,548,173 A * | 8/1996 | Stephenson | ............ | H02K 1/246 310/168 |
| 5,552,653 A * | 9/1996 | Nose | ........................ | H02K 1/14 310/12.22 |
| 5,691,591 A * | 11/1997 | McCann | ................ | H02K 26/00 310/180 |
| 5,811,905 A * | 9/1998 | Tang | ........................ | H02K 3/28 310/162 |
| 5,814,965 A * | 9/1998 | Randall | ................ | H02P 25/0925 318/400.11 |
| 5,825,112 A * | 10/1998 | Lipo | ..................... | H02K 19/103 310/168 |
| 5,825,113 A * | 10/1998 | Lipo | ..................... | H02K 21/44 310/162 |
| 6,271,616 B1 * | 8/2001 | Akemakou | ............ | H02K 1/278 310/152 |
| 6,459,185 B1 * | 10/2002 | Ehrhart | .................... | H02K 1/20 310/156.35 |
| 6,819,026 B2 | 11/2004 | Narita et al. | | |
| 7,453,176 B2 * | 11/2008 | Davison | ................ | F16H 49/001 310/209 |
| 7,723,888 B2 | 5/2010 | Petek | | |
| 8,544,580 B2 * | 10/2013 | Cheng | ...................... | H02P 25/08 180/65.51 |
| 8,736,136 B2 * | 5/2014 | Lee | ........................ | H02K 1/146 310/166 |
| 2002/0011811 A1 * | 1/2002 | Chen | ..................... | B62D 5/046 318/400.01 |
| 2003/0222617 A1 * | 12/2003 | Nakai | ..................... | F16H 61/32 318/701 |
| 2006/0131986 A1 | 6/2006 | Hsu et al. | | |
| 2006/0279155 A1 * | 12/2006 | Holtzapple | ............... | F01C 1/10 310/168 |
| 2007/0222304 A1 * | 9/2007 | Jajtic | ........................ | H02K 1/06 310/12.18 |
| 2008/0129244 A1 * | 6/2008 | Randall | ................... | H02P 25/08 318/701 |
| 2008/0169720 A1 | 7/2008 | Petek | | |
| 2008/0197793 A1 * | 8/2008 | Randall | ................ | H02P 25/092 318/254.1 |
| 2010/0231062 A1 * | 9/2010 | Sykes | ..................... | H02K 3/47 310/46 |
| 2011/0193507 A1 * | 8/2011 | Ramu | ..................... | H02P 25/04 318/400.15 |
| 2011/0284300 A1 * | 11/2011 | Cheng | ..................... | H02P 25/08 180/65.51 |
| 2011/0285238 A1 | 11/2011 | Kusase | | |
| 2011/0316366 A1 * | 12/2011 | Abbasian | ................ | H02K 16/04 310/46 |
| 2013/0099618 A1 | 4/2013 | Kusase | | |

\* cited by examiner

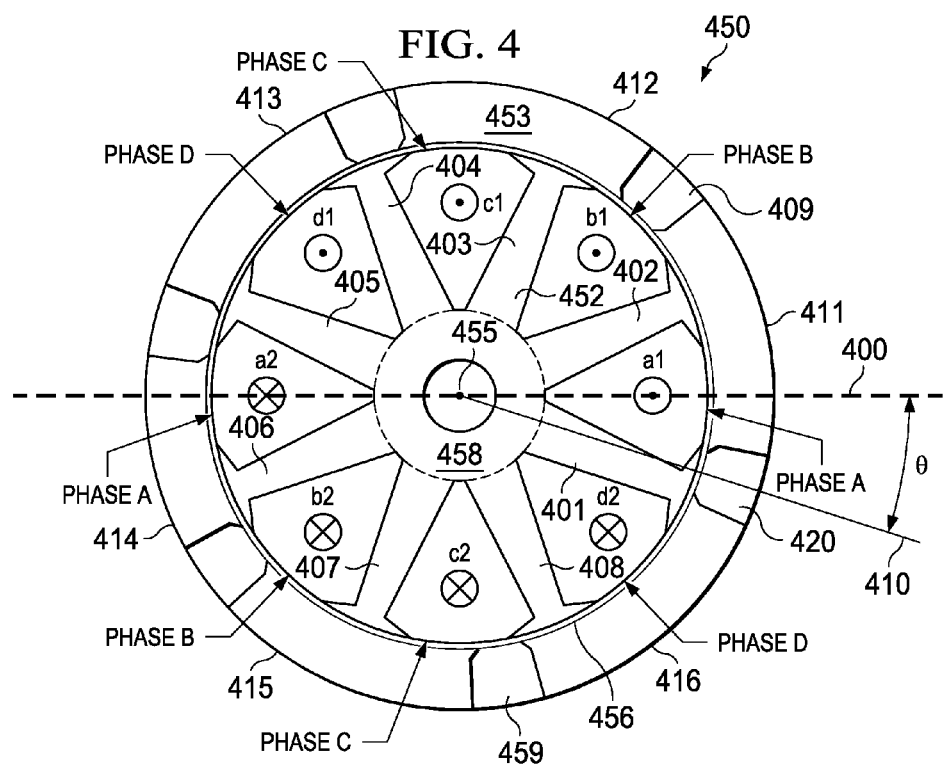
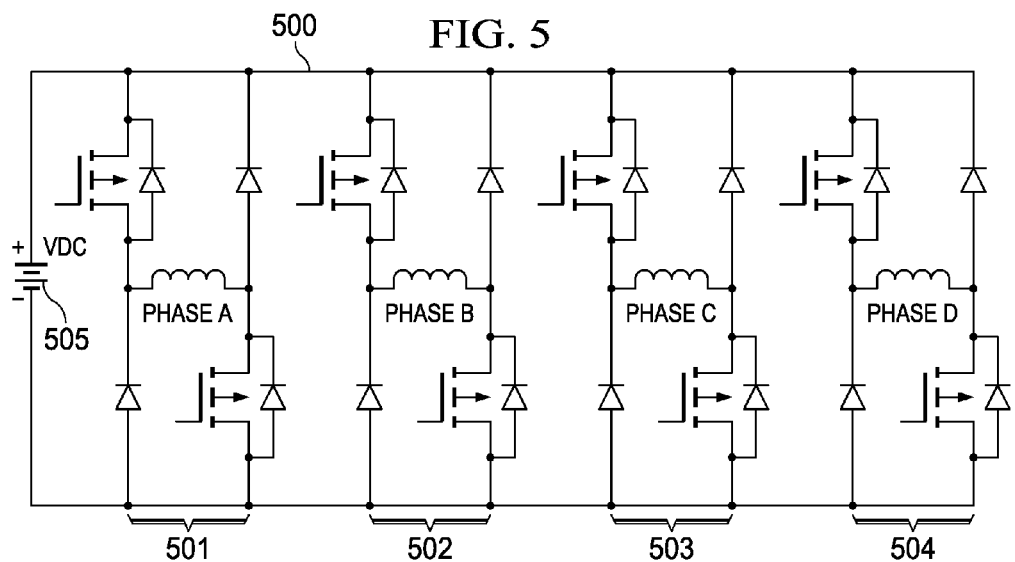

DOUBLE SALIENCY EXTERIOR ROTOR SWITCHED RELUCTANCE MACHINE WITH INCREASING AND DECREASING FLUX LINKAGES AND PERMANENT MAGNETS

CROSS REFERENCE TO RELATED APPLICATION

This application claims priority to U.S. Provisional Application No. 61/840,949 filed Jun. 28, 2013. This application is a continuation in part of U.S. application Ser. No. 13/169,233 filed Jun. 27, 2011, which claims priority to U.S. Provisional Application No. 61/358,583 filed Jun. 25, 2010. Each of the above identified patent applications is incorporated herein by reference in its entirety to provide continuity of disclosure.

FIELD OF THE INVENTION

This invention relates generally to switched reluctance machines, and more particularly to a switched reluctance machine that optimizes the distribution of magnetic flux and optimizes torque.

BACKGROUND OF THE INVENTION

Conventional switched reluctance machines feature a rugged structure, robust performance in harsh ambient conditions, and low manufacturing cost. However, the majority of the electromagnetic forces generated by a conventional switched reluctance machine does not contribute to useful work, and a significant proportion of these forces generates undesirable vibrations that have been identified as a major drawback for such machines. Thus, limited torque density and energy conversion efficiency, among other characteristics, of conventional switched reluctance machines has limited their industrial applicability.

For example, U.S. Pat. No. 5,304,882 to Lipo et al. discloses a variable reluctance motor with permanent magnet excitation having a single set of stators and a single rotor having permanent magnets. However, the motor in Lipo requires a significant amount of permanent magnet material, thereby making the manufacturing of such motor expensive. Further, the disclosed motor is limited in the amount of electromagnetic forces contributing to rotational motion, thereby limiting the torque density of the motor and the overall efficiency of the motor.

Therefore, there is a need in the art for a switched reluctance machine in which a higher proportion of the electromagnetic forces generated contributes to motion with a reduced amount of permanent magnet material, thereby lowering the overall cost of manufacturing.

SUMMARY

In one embodiment, an exterior rotor switched reluctance machine includes a stator having a back iron and a set of stator poles connected to and extending radially outward from the back iron equally spaced with respect to each other, a rotor having a shaft and a set of segments adjacent the stator and rotatively coupled to the stator and a housing, a set of stator windings disposed between each of the stator poles, a set of phases, each phase including a subset of the set of stator windings whereby selectively energizing the set of phases with a current, thereby causing the rotor to rotate respect to the stator.

In another embodiment, an exterior rotor switched reluctance machine includes a stator having a back iron and a set of stator poles connected to and extending radially outward from the back iron equally spaced with respect to each other, a rotor having a shaft and a set of segments adjacent the stator and rotatively coupled to the stator and a housing, each segment having a permanent magnet, a set of stator windings disposed between each of the stator poles, a set of phases, each phase including a subset of the set of stator windings whereby selectively energizing the set of phases with a current rotates the rotor with respect to the stator.

In another embodiment, an exterior rotor switched reluctance machine includes a stator having a back iron and a set of stator poles connected to and extending radially outward from the back iron equally spaced with respect to each other, a rotor having a shaft and a set of segments adjacent to the stator and rotatively coupled to the stator and a housing, a set of stator windings disposed between each of the stator poles, a set of phases, each phase including a subset of the set of stator windings whereby applying a torque to the shaft selectively energizes the set of phases.

In another embodiment, an exterior rotor switched reluctance machine includes a stator having a back iron and a set of stator poles connected to and extending radially outward from the back iron equally spaced with respect to each other, a rotor having a shaft and a set of segments adjacent the stator and rotatively coupled to the stator and a housing, each segment having a permanent magnet, a set of stator windings disposed between each of the stator poles, a set of phases, each phase including a subset of the set of stator windings whereby applying a torque to the shaft selectively energizes the set of phases.

BRIEF DESCRIPTION OF THE DRAWINGS

The disclosed embodiments will be described with reference to the accompanying drawings. Like pieces in different carry the same number.

FIG. 4 is a cross-sectional view of an 8/6 configuration of a preferred embodiment of an exterior rotor switched reluctance machine.

FIG. 5 is a circuit diagram for a half bridge drive circuit.

DETAILED DESCRIPTION

Figure 1:
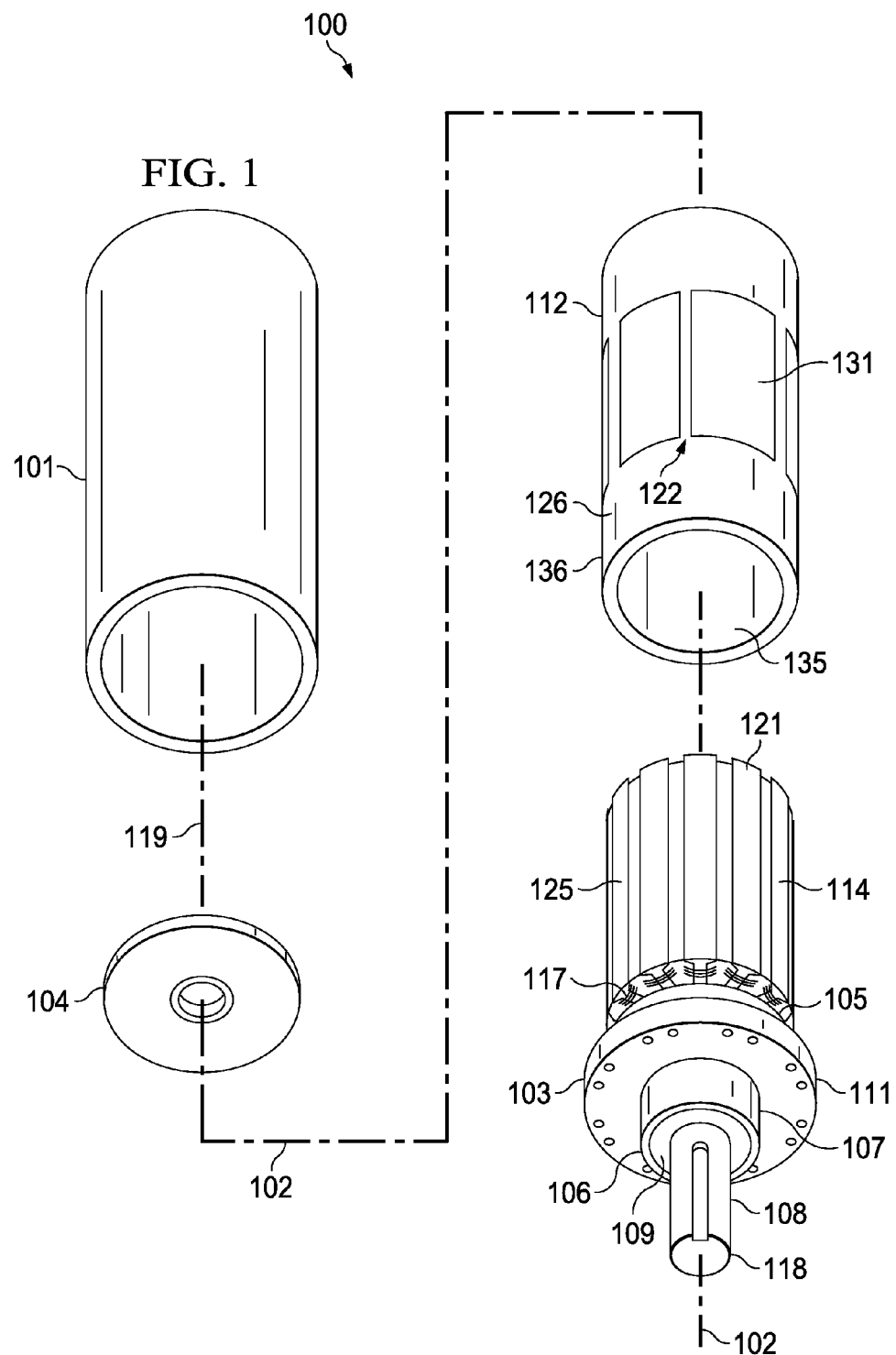
FIG. 1 is an exploded isometric view of a preferred embodiment.

Illustrative embodiments of the invention are described herein. In the interest of clarity, not all features of an actual implementation are described in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

Embodiments of the present invention provide for an exterior rotor switched reluctance machine, which is a variable reluctance synchronous machine designed to perform at high levels of energy conversion efficiency. The exterior rotor switched reluctance machine is a singly-excited or a multiple-excited double saliency machine having concentrated phase coils with a diametrical pitch, which are placed on a set of stator poles and connected to form a multiphase machine. The magneto-motive force orientation of the coils is such that a short flux path may be created and maintained at all times.

The inventors of the instant application compared the performance of an exterior rotor switched reluctance machine with that of a conventional switched reluctance machine and a double stator switched reluctance machine by employing a two dimensional finite element model and by constructing a prototype. Using these investigative tools, the inventors analyzed the forces generated in operation of the exterior rotor switched reluctance machine and in operation of a conventional switched reluctance machine. Based on this analysis, the inventors found that in a conventional switched reluctance machine the majority of the electromagnetic force generated is in a radial direction, perpendicular to the direction of motion. Ideally, motional force should be maximized and the radial component of force should be minimized. Compared to a conventional switched reluctance machine, the exterior rotor switched reluctance machine was found to produce more motional force and less radial force or, in other words, a greater percentage of electromagnetic forces effectively acting in the direction of motion. In this regard, the energy conversion efficiency may be used as a metric to compare performance, as a high energy conversion efficiency is indicative of the ability of an electric machine to generate large motional forces while generating limited radial forces.

The electromagnetic forces generated by an electric machine can be viewed as the product of interaction between normal and tangential components of the magnetic flux density. Thus, flux distribution plays a very important role in force generation. The exterior rotor switched reluctance machine has an alternative structural configuration or geometry, which yields a flux distribution very different from that of a conventional switched reluctance machine. This different flux distribution provides a more productive force profile than that of a conventional switched reluctance machine.

Two key aspects of the flux distribution of the exterior rotor switched reluctance machine are as follows. First, in operation of the exterior rotor switched reluctance machine, a short flux path is created and maintained during operation. In particular, stator segments not participating in energy conversion are not magnetized, so that energy is not diverted to this end. In addition, eddy currents are thus not produced in the stator segments not participating in energy conversion, thus reducing core losses. Second, in operation of the exterior rotor switched reluctance machine, the amount of flux entering the corner tips and the side surfaces (parallel to the radius of the rotor) of the rotor segments in a direction of motion is greatly increased while the amount of flux entering the rotor segment from a direction perpendicular to the direction of motion is greatly decreased. This relative increase in flux in the direction of motion, including in particular the fringing flux (i.e., flux entering the corner tips of the rotor segments), greatly increases the motional force produced. In addition, the reduction in force generated perpendicular to the direction of motion reduces acoustic noise.

Other advantages of the exterior rotor switched reluctance machine include fault tolerance, reduced inertia, extended speed range capability, modular configuration, ability to operate without a position sensor, and ability to operate in harsh ambient conditions.

An exterior rotor switched reluctance machine according to embodiments of the present invention will now be described in further detail, first, as to the structure thereof, and second, as to the operation thereof. Related detail for a double stator switched reluctance machine may be found in the article, "Double-Stator Switched Reluctance Machine (DSSRM): Fundamentals and Magnetic Force Analysis," IEEE Transactions on Energy Conversion, Volume 25, Issue 3, September 2010, by the inventors of the instant application, which is included in U.S. provisional patent application No. 61/358,583, which is incorporated herein by reference. Reference is at times made in the instant application to what are understood to be reasons underlying improved performance of the present invention vis a vis the prior art. While statements of such reasons represent the inventors' beliefs based on scientific research, the inventors nonetheless do not wish to be bound to theory.

Figure 2:
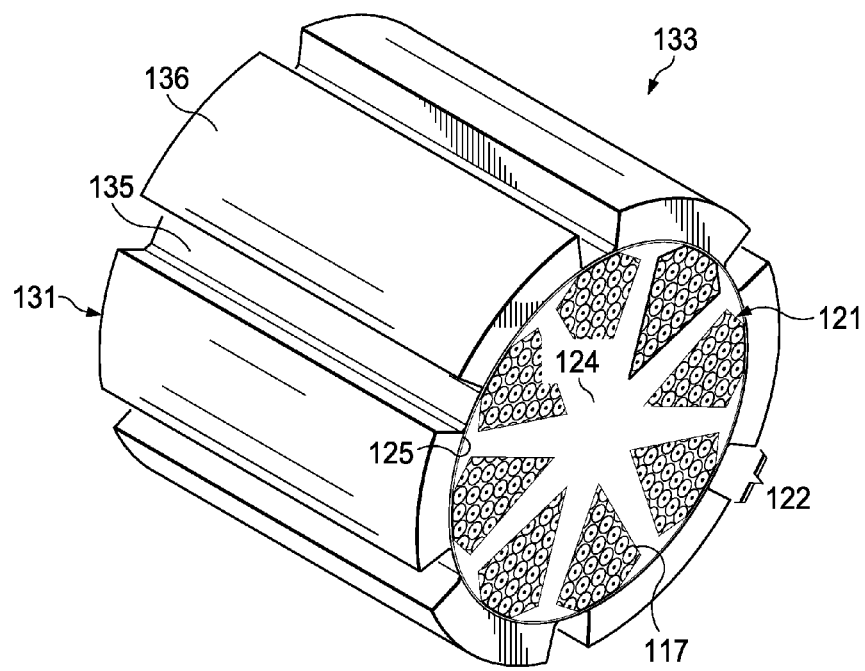
FIG. 2 is a perspective view of a preferred embodiment.
Figure 3:
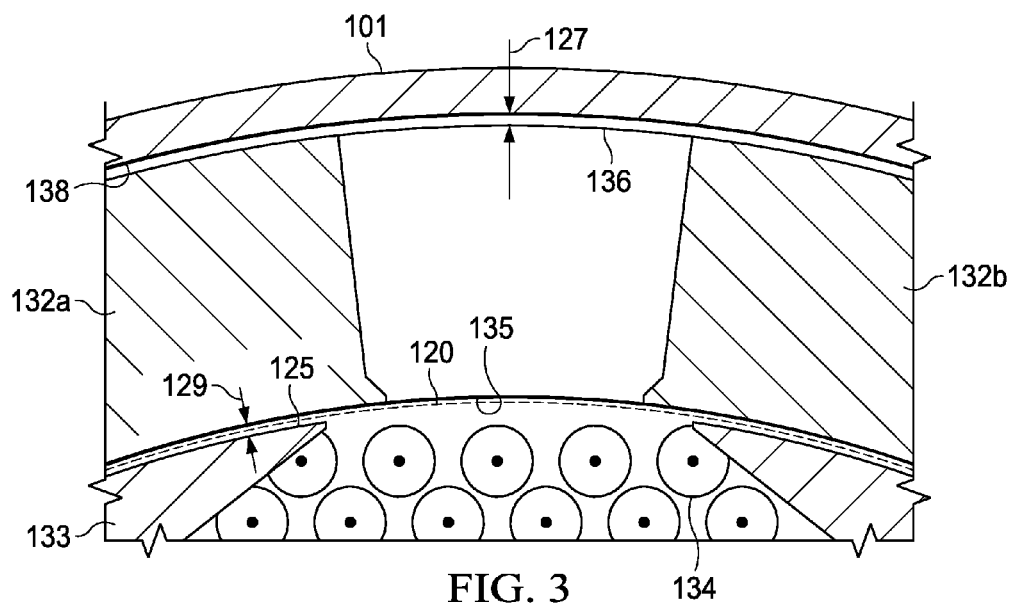
FIG. 3 is a partial section view of a preferred embodiment.

Referring to FIGS. 1-3, exterior rotor switched reluctance machine 100 includes three primary components: housing 101, rotor 112, and stator 114. Each of housing 101, rotor 112, and stator 114 are cylindrical in shape. Stator 114 is disposed at the radial center of exterior rotor switched reluctance machine 100, rotor 112 is disposed radially outward of stator 114, and housing 101 is disposed radially outward of rotor 112. Each of stator 114, rotor 112, and housing 101 are concentric, having the same cylindrical axis 102, which may also be deemed the cylindrical axis of exterior rotor switched reluctance machine 100.

Exterior rotor switched reluctance machine 100 has a front axial end 118 and a rear axial end 119 at either end of cylindrical axis 102 thereof. Rear axial end 119 of exterior rotor switched reluctance machine 100 has components to house portions of wiring, which are selectively energized in operation of the apparatus, as described below. Front axial end 118 of exterior rotor switched reluctance machine 100 is adapted for connecting a load to motor shaft 108 and thereby to rotor 112. In many possible embodiments, either axial end of exterior rotor switched reluctance machine 100 may be used for either of these functions.

As seen most easily in FIG. 1, stator 114 connects to rotor 112 by a front bearing assembly 103 and a rear bearing assembly 104. A rotor mount 105, attached to motor shaft 108, is rotatably connected to front bearing assembly 103 by ball bearing 109. Motor shaft 108 rides on inner race 106 of ball bearing 109. Front bearing assembly 103 includes a housing flange 111 which is connected to outer race 107 of ball bearing 109. Housing flange 111 is fixed to housing 101. Rear bearing assembly 104, shares the same features as front bearing assembly and is rotatably connected to rotor 112 and fixed to housing 101. Housing 101 and stator 114 remain stationary with respect to each other while rotor 112 rotates about cylindrical axis 102.

In a preferred embodiment, exterior rotor switched reluctance machine 100 operates as a motor, converting a supplied electrical energy into a rotating mechanical energy of motor shaft 108 and the load. In an alternate embodiment, exterior rotor switched reluctance machine 100 is configured as a generator, converting rotating mechanical energy of motor shaft 108 into an electrical energy.

As seen in FIGS. 1 and 2, rotor 112 may be described as a shell-type or drum rotor exterior to stator 114. Rotor 112 includes a cylindrical cage 126 housing, a set of rotor segments 131 separated by a set of gaps 122. Set of rotor segments 131 are formed so as not to project radially outward or inward from cylindrical cage 126, and thus may be thought of as arcuate portions of rotor 112. The radially outer surface of each rotor segment is flush or substantially flush with the rotor outer surface 136 of cylindrical cage 126. The radially inner surface of each rotor segment is also flush or substantially flush with the rotor inner surface 135 of cylindrical cage 126. Because of its form, rotor 112 is understood to be lighter than a rotor of a conventional switched reluctance machine. Accordingly, rotor 112 is understood to exhibit a low moment of inertia and a fast response time.

Stator 114 has a set of stator poles 121, projecting radially outward from back iron 124 and terminating at stator outer surface 125. Back iron 124 is the radially inner portion of stator 114 located closest to the cylindrical axis thereof. Between each pair of adjacent stator poles in set of stator poles 121, a respective winding segment in a set of winding segments 117 is disposed, each winding segment predominantly parallel to cylindrical axis 102.

Each winding segment is assigned to a phase, carrying an electrical current in a particular direction at a particular time. The phase assignments and details regarding energizing the set of winding segments will be described more fully below.

Each member of the set of stator poles 121 and set of rotor segments 131 are formed as a single portion extending along the entire stack length of exterior rotor switched reluctance machine 100. Thus, the respective cross-sections of the set of stator poles 121 and the set of rotor segments 131 remain the same throughout the respective stack lengths of stator 114 and rotor 112. The stack lengths of stator 114 and rotor 112 may extend to most of the length of exterior rotor switched reluctance machine 100 and cylindrical cage 126, respectively.

In a preferred embodiment, each member of the set of stator poles and the set of rotor segments are formed of a soft ferromagnetic material. In particular, set of rotor segments 131 and set of stator poles 121 are formed of silicon steel and, more preferably, of M-19. In an alternate embodiment, silicon steel of other grades or M-numbers, for example, up to M-49, are employed. The grade or M-number indicates a maximum core loss, with higher M-numbers indicating higher maximum core losses. Though not required, it is preferable for the material forming each rotor segment and each stator segment to be laminated. Lamination serves to reduce losses due to eddy currents. This description of materials is not to be taken as limiting.

Referring to FIGS. 2 and 3, the assembled stator and rotor includes rotor segment 132a, rotor segment 132b, windings segment 134 and stator pole 133. Rotor 112 is mounted coaxial with respect to the stator leaving an air gap 129 between rotor inner surface 135 and stator outer surface 125. There is also an air gap 127 maintained between rotor outer surface 136 and housing inner surface 138. A cylindrical surface contour 120 is defined for calculation purposes as being coaxial with cylindrical axis 102 and having a radius halfway between the radius of stator outer surface 125 and rotor inner surface 135 within air gap 129. Air gaps 127 and 129 permit rotation of the rotor 112 with respect to stator 114 and housing 101. In a preferred embodiment, air gaps 127 and 129 have a radial extent of about 1.0 mm. However, other air gaps are allowable depending upon the physical geometry and magnetic properties of the stator, the rotor and the housing.

The number of rotor segments is preferably different from the number of poles of the stator, as this precludes the possibility of all the rotor segments aligning with all of the stator poles, in which position no torque can be generated.

The number of stator segments is an even number, spaced at equal angular intervals about the cylindrical axis. The number of rotor segments is also an even number, also spaced at equal, but different angular intervals about the cylindrical axis. Given that the number of poles of either stator is even and that the poles of either stator are spaced at equal angular or circumferential intervals, it follows that for any given pole of a given stator there will be another pole of the given stator at a position diametrically opposed to the given pole. That is, if a given pole of a given stator is positioned at, for example, 0 degrees, another pole of the given stator will be positioned at 180 degrees.

As will be appreciated by one of ordinary skill in the art, exterior rotor switched reluctance machine 100 may have any of various configurations as to numbers of stator poles and rotor segments. As non-limiting examples, exterior rotor switched reluctance machine 100 may have any of the following configurations: 6/4, 8/6, 10/8, 12/8 and 16/12, where the first number indicates the number of stator poles per stator and the second number indicates the number of rotor segments.

By example only, the embodiments of the present disclosure illustrate an 8/6 configuration in which exterior rotor switched reluctance machine 100 has eight outer stator poles, six rotor segments. Other configurations may be easily conceived and the invention is not intended to be limited by the disclosed configurations.

A preferred embodiment of a stator and rotor configuration is provided in FIG. 4. Stator and rotor configuration 450 comprises stator 452 and rotor 453 concentrically aligned with cylindrical axis 455. Air gap 456 separates the outer surface of stator 452 from the inner surface of rotor 453.

Rotor 453 includes segments 411, 412, 413, 414, 415, and 416 attached to rotor cage 409 and evenly spaced with respect to each other along rotor cage 409 which separates the rotor segments by a set of gaps 459.

Stator 452 comprises back iron 458 and stator poles 401, 402, 403, 404, 405, 406, 407, and 408 spaced at equal intervals with respect to each other, each connected to and radially extending from back iron 458.

Stator 452 further comprises windings $a_1, b_1, c_1, d_1, a_2, b_2, c_2$ and $d_2$ which are disposed in counterclockwise sequence (starting at about 3 o'clock in the figure) between successive pairs of stator poles: winding $a_1$ between stator pole 401 and stator pole 402, winding $b_1$ between stator pole 402 and stator pole 403, winding $c_1$ between stator pole 403 and stator pole 404, winding $d_1$ between stator pole 404 and stator pole 405, winding $a_2$ between stator pole 405 and 406, winding $b_2$ between stator pole 406 and stator pole 407, winding $c_2$ between stator pole 407 and stator pole 408 and winding $d_2$ between stator pole 408 and stator pole 401. Rotor 453 does not have any windings.

The illustrated arrow heads (dots) and arrow tails (Xs) indicate the direction of current flow through the set of windings when each winding is energized during operation of the exterior rotor switched reluctance machine: a dot meaning that the current is flowing along the cylindrical axis towards the front axial end, an X meaning that the current is flowing along the cylindrical axis towards the rear axial end. Windings $a_1$ and $a_2$ are energized together as phase a, windings $b_1$ and $b_2$ are energized together as phase b, windings $c_1$ and $c_2$ are energized together as phase c and windings $d_1$ and $d_2$ are energized together as phase d.

In the preferred embodiment, the windings corresponding to each phase are connected in series: windings $a_1$ and $a_2$ are connected in series, windings $b_1$ and $b_2$ are connected in series, windings $c_1$ and $c_2$ are connected in series, and, windings $d_1$ and $d_2$ are connected in series. In addition, the windings corresponding to a given phase are electrically isolated from the other windings: windings $a_1$ and $a_2$ are electrically isolated from windings $b_1, b_2, c_1, c_2, d_1$ and $d_2$; windings $b_1$ and $b_2$ are electrically isolated from windings $a_1, a_2, c_1, c_2, d_1$ and $d_2$ and so on.

A radial stator axis 400 is defined to be along the central axis between adjacent stator poles, stator pole 401 and stator pole 402, through the center of windings $a_1$ and $a_2$. A radial rotor axis 410 is defined to be along a radial axis extending from the cylindrical axis through the center of a reference air gap 420 which is between rotor segments 411 and 416. The position of the rotor is defined for this embodiment as the angle between the radial rotor axis 410 and the radial stator axis 400 measured positively in the clockwise direction. The angular position θ of rotor 453, as shown in FIG. 4, is about +15°.

In an example embodiment as shown in FIG. 4, stator and rotor configuration is an 8/6 configuration, i.e., eight stator poles and six rotor segments spaced at even angular intervals.

In a preferred embodiment, rotor segments 411, 412, 413, 414, 415, and 416 are positioned at intervals of 60° on center with respect to each other. In other stator and rotor configurations, other intervals are employed.

In a preferred embodiment, stator poles 401, 402, 403, 404, 405, 406, 407, and 408 are positioned at intervals of 22.5° with respect to each other. In other stator and rotor configurations, other intervals are employed.

In a preferred embodiment, each of stator poles 401, 402, 403, 404, 405, 406, 407, and 408 have an arc length of approximately 25° at air gap 456. In other stator and rotor configurations, other arc lengths are employed.

In a preferred embodiment, stator 402 is made of M-19 laminated electric silicon steel. In other stator and rotor configurations, other grades of laminated electric silicon steel not exceeding M-49 may be employed.

In a preferred embodiment, each of rotor segments 411, 412, 413, 414, 415, and 416 is made of M-19 laminated electric silicon steel. In other embodiments, other grades of laminated electric silicon steel not exceeding M-49 can be employed.

In a preferred embodiment, windings $a_1$, and $a_2$, $b_1$, and $b_2, c_1$, and $c_2, d_1$ and $d_2$ are made of copper. Other suitable conductive materials known in the art can be employed.

Referring to FIG. 5, circuit 500 drives exterior rotor switched reluctance machine 100 with the stator and rotor configuration 450. Circuit 500 comprises bridge converters 501, 502, 503, and 504 controlling phases a, b, c, and d, respectively. Each of bridge converters 501, 502, 503, and 504 is an asymmetric half bridge converter providing positive current. Bridge converters 501, 502, 503 and 504 are connected in parallel across a power source 505.

Figure 11:
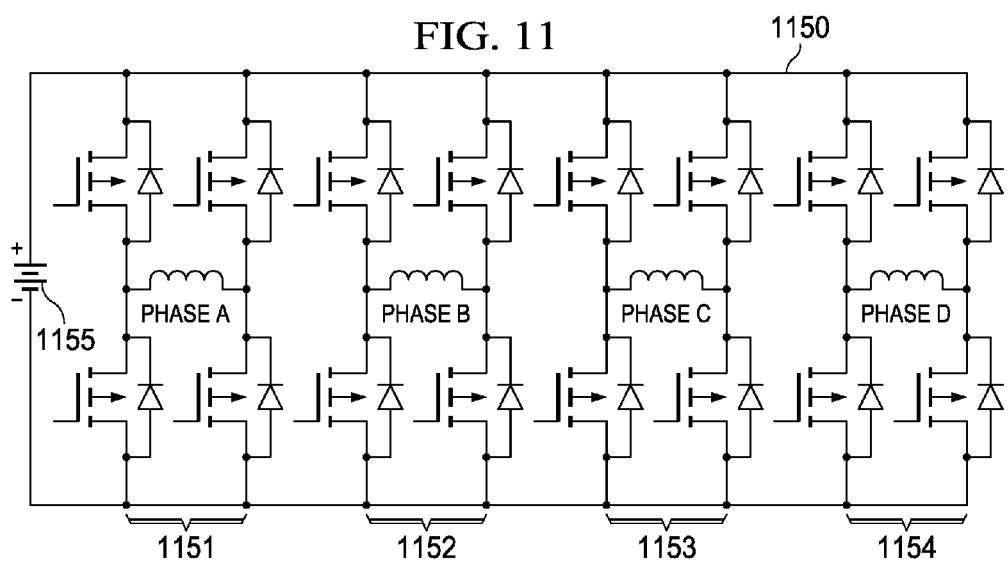
FIG. 11 is a circuit diagram for a full bridge drive circuit.

In another embodiment, a full bridge converter having independent control of each phase current magnitude and direction is utilized (see FIG. 11).

The basic principle of operation of an exterior rotor switched reluctance machine is that electromagnetic torque is generated by the tendency of the magnetic circuit to realize the configuration of minimum magnetic reluctance (resistance). When a given phase is excited by causing a current to flow through the windings of that phase, the rotor segments (two diametrically opposed segments) nearest the energized windings are attracted thereto, and thus align themselves respectively with the pairs of stator poles between which the windings are disposed. In this so-called aligned position, the reluctance is at a minimum. Since the number of rotor segments is not equal to the number of poles of either stator, when the two diametrically opposed rotor segments are aligned with pairs of stator poles, another two diametrically opposed rotor segments will be in so-called unaligned position. Exciting the phase adjacent to the unaligned rotor segments will cause those rotor segments to symmetrically align themselves respectively with the pairs of stator poles of that phase, since reluctance is at a maximum in the unaligned position. By successively exciting adjacent phases, the rotor is caused to rotate, generating torque which can be applied to an attached load. The successive exciting of different phases involves the switching of current into different stator windings as reluctance varies, hence the name switched reluctance machine. It may be noted that when reluctance is at a minimum, inductance is at a maximum, and vice versa.

Torque is produced in this embodiment of the exterior rotor switched reluctance machine by reluctance force due to variation of phase inductance at various rotor positions. If current is applied while the inductance is increasing, positive torque will be produced. If current is injected while the inductance is decreasing, negative torque will be generated. The direction of current does not affect the direction of produced reluctance torque. Multiphase excitation can be implemented whereby currents are injected in multiple phases simultaneously to increase torque production.

By way of example, in FIG. 4, when phase a is energized, rotor segments 411 and 414 will be pulled into alignment with the pairs of stator poles 401, 402 and 405, 406 of phase a, that is, segments 411 and 414 will rotate clockwise. Next, phase b is excited, pulling segments 412 and 415 clockwise into alignment with the pairs of stator poles 402, 403 and 406, 407 of phase b. By continuing to excite each adjacent phase in counterclockwise succession, rotor 453 is made to rotate in the clockwise direction. Exciting adjacent phases in a clockwise succession will cause rotor 453 to rotate counterclockwise.

In a sequential excitation of phases, a given phase may be excited when the opposing rotor segments, nearest the windings to be energized, are in an unaligned position or shortly thereafter, and then the given phase is turned off, i.e., the windings corresponding to the phase are deenergized, just before the rotor segments align between the stator pole pairs surrounding the phase. It is generally desirable to avoid permitting rotor segments to reach alignment with the energized stator poles in order to avoid generating negative torque.

The above description pertains to operating the exterior rotor switched reluctance machine as a motor, in which case positive torque is to be generated. In order to operate the motor, stator phase excitation needs to be synchronized with the rotor position. A discrete encoder or resolver will perform the functionality. However, as the position information is also encoded in the inductance profile and induced back EMF, a position sensorless method can be developed as long as there is access to the applied phase current and voltage.

In a generator embodiment, the exterior rotor switched reluctance machine is operated as a generator, in which case external torque is applied. When operated as a generator, a given phase produces a current pulse while the rotor segments nearest the windings to be energized are brought into an aligned position or shortly thereafter. The given phase may then be unexcited, i.e., the windings corresponding to the phase may be switched off, just before the rotor segments reach a fully unaligned position relative to the stator poles surrounding the given phase.

Torque is calculated according to a Maxwell tensor method using cylindrical surface contour 120 in the middle of the stator/rotor air gap (see FIG. 3). The following magneto motive force (MMF) is obtained, $$N \cdot i = H_{air} \cdot l_{air} + H_{iron} \cdot l_{iron},$$ Eq. 1 in which N and i represent number of turns in a winding segment and the excitation current in the winding segment. $H_{air}$, $H_{iron}$ represents magnetic field intensity in air and $H_{iron}$ represents magnetic field intensity in iron. $l_{air}$ represents average flux path in air and $l_{iron}$ represents average flux path in iron. The last term in Eq. 1 can be neglected due to the high permeability of ferromagnetic material, yielding, $$N \cdot i = H_{air} \cdot l_{air}.$$ Eq. 2

Flux densities are then calculated as follows, $$B_n = \mu_0 \cdot H_{air\_n}$$ Eq. 3

$$B_t = \mu_0 \cdot H_{air\_t}$$ Eq. 4 where $B_t$ denotes tangential flux density, $B_n$ denotes normal flux density, $H_{air\_t}$ denotes tangential magnetic field intensity, $H_{air\_n}$ denotes normal flux density and $\mu_o$ is permeability of air. The normal direction is normal to cylindrical surface contour 120 and the tangential direction is along cylindrical surface contour 120 in the direction of rotational motion.

The Maxwell tensor method is applied to calculate the force density along the circular contour, $$f_t = \frac{B_t \cdot B_n}{\mu_0}$$ Eq. 5

$$f_n = \frac{B_n^2 - B_t^2}{2\mu_0}$$ Eq. 6 where $f_t$ and $f_n$ denote tangential and normal force density, respectively. Force densities in Eq. 5 and Eq. 6 are integrated along the circular contour to calculate the overall tangential and normal force $F_t$ and $F_n$, $$F_t = \oint f_t dl, \text{ and}$$ Eq. 7

$$F_n = \oint f_n dl.$$ Eq. 8

In Eq. 7 and Eq. 8, l indicates the circular contour in the air gap and it follows the relationship, $$l = 2 \cdot \pi \cdot r,$$ Eq. 9 in which r is the radius of the circular contour and relates to the radius of rotor. Finally, torque is calculated as follow, $$T = F_t \cdot l = \oint f_t \cdot l \cdot dl.$$ Eq. 10

If the flux density $B_t$ and $B_n$ are maintained in the middle of the air gap, the relationship of torque to the radius of the rotor is, $$T \propto r^2.$$ Eq. 11

Figure 6A:
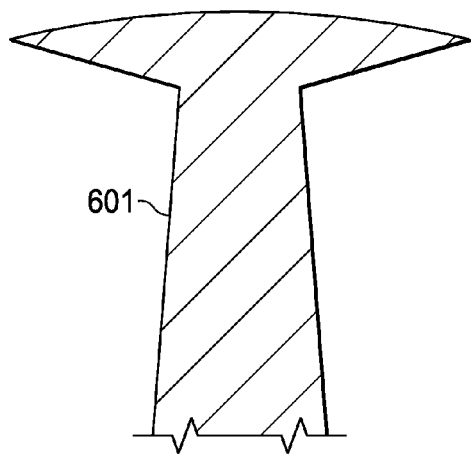
FIG. 6A is a cross-section view of a stator pole featuring a beveled profile.
Figure 6B:
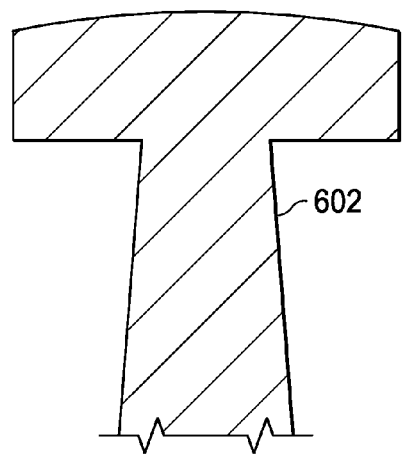
FIG. 6B is a cross-section view of a stator pole featuring a blocked profile.

The torque is then computed for three cases: a double stator switched reluctance machine (DSSRM), an exterior rotor switched reluctance machine (ERSRM1) with a beveled stator profile and an exterior rotor switched reluctance machine (ERSRM2) with a blocked stator profile. FIG. 6A shows a cross-section view of a stator pole 601 with the beveled stator profile. FIG. 6B shows a cross-section view of a stator pole 602 with the blocked stator profile. The results of the torque computations are shown in FIGS. 7 and 8.

Figure 7:
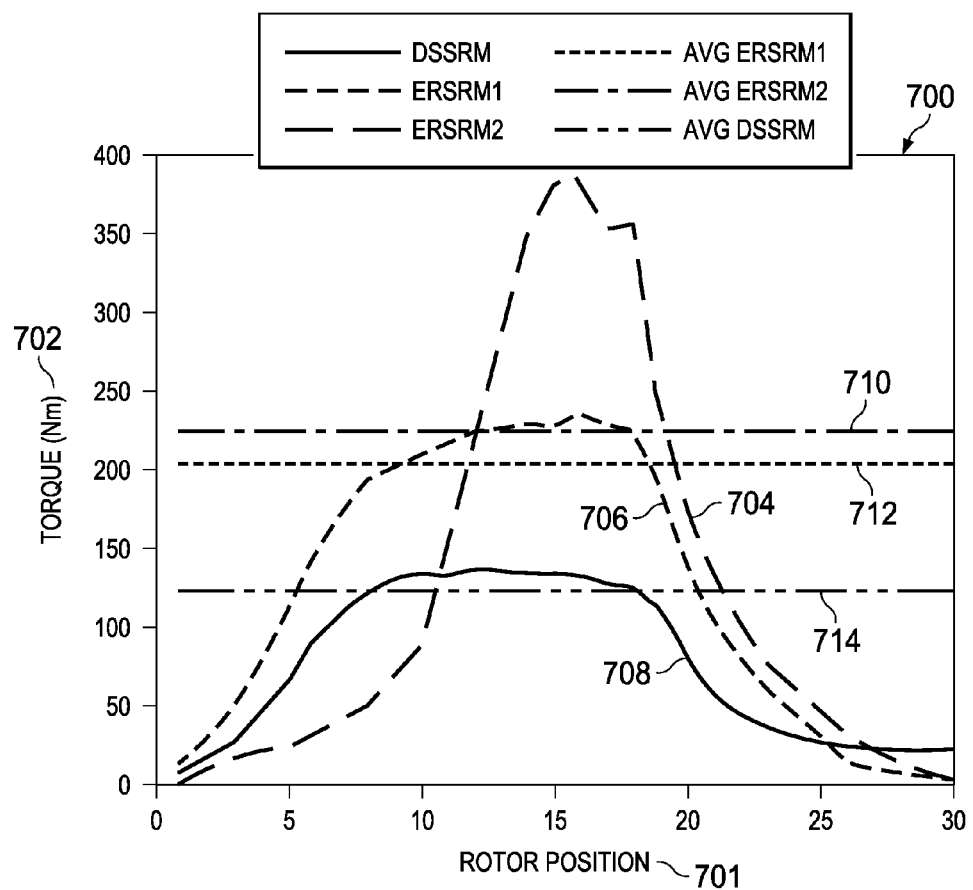
FIG. 7 is a graph of torque versus rotor position comparing torque produced by a single phase excitation of an exterior rotor switched reluctance machine having a beveled stator profile, of an exterior rotor switched reluctance machine having a blocked stator profile and of a double stator switched reluctance machine.

In FIG. 7, a set of graphs 700 of torque 702 versus rotor position 701 for a single phase excitation is provided where rotor position is measured in degrees. Graph 708 is a computed torque profile for the double stator switched reluctance machine, peaking at about 125 Nm. Graph 706 is a computed torque profile for the exterior rotor switched reluctance machine with the blocked stator profile, peaking at about 230 Nm. Graph 704 is a computed torque profile for the exterior rotor switched reluctance machine with the beveled stator profile, peaking at about 380 Nm. The torque averaged through all angles of rotation for each type of apparatus is also provided in set of graphs 700. Graph 714 is the computed average torque at about 120 Nm for the double stator switched reluctance machine. Graph 712 is the computed average torque at about 200 Nm for the exterior rotor switched reluctance machine with the blocked stator profile. Graph 710 is the computed average torque at about 220 Nm for the exterior rotor switched reluctance machine with the beveled stator profile.

Figure 8:
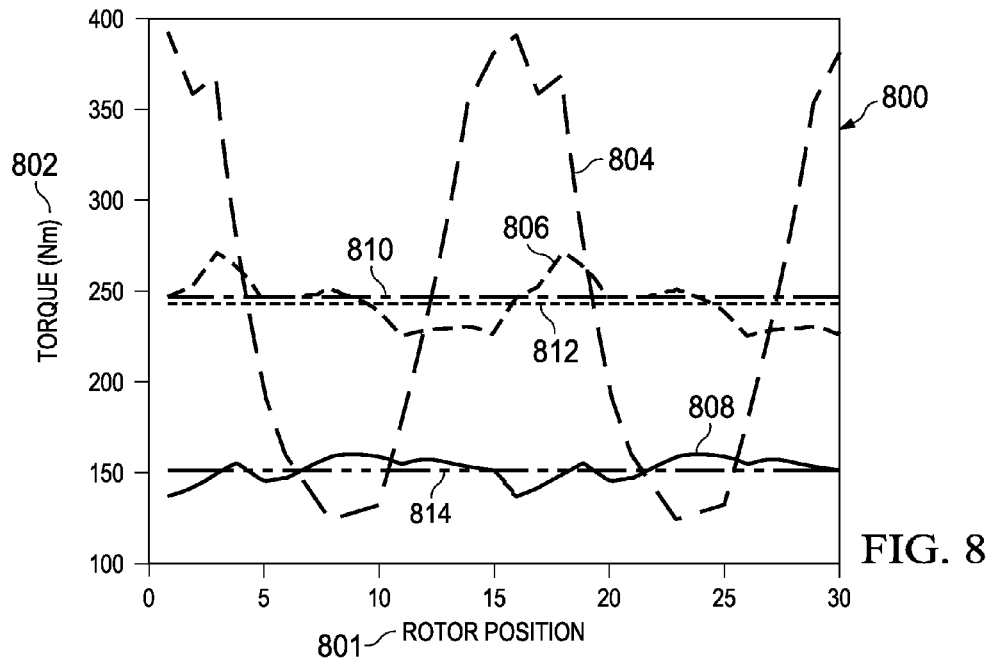
FIG. 8 is a graph of torque versus rotor position produced by multiphase excitation of an exterior rotor switched reluctance machine having a beveled stator profile, of an exterior rotor switched reluctance machine having a blocked stator profile and of a double stator switched reluctance machine.

In FIG. 8, a set of graphs 800 of torque 802 versus rotor position 801 is provided for multiphase excitation, wherein multiple phases are energized simultaneously in synchronization. Graph 808 is a computed torque profile for the double stator switched reluctance machine, peaking at about 160 Nm. Graph 806 is a computed torque profile for the exterior rotor switched reluctance machine with the blocked stator profile, peaking at about 270 Nm. Graph 804 is a computed torque profile for the exterior rotor switched reluctance machine with the beveled stator profile, peaking at about 390 Nm. The torque averaged through all angles of rotation for each type of apparatus is also provided in set of graphs 800. Graph 814 is the computed average torque at about 150 Nm for the double stator switched reluctance machine. Graph 812 is the computed average torque at about 240 Nm for the exterior rotor switched reluctance machine with the blocked stator profile. Graph 810 is the computed average torque at about 245 Nm for the exterior rotor switched reluctance machine with the beveled stator profile.

From above equations and graphs, several conclusions can be drawn as described in the following paragraphs.

According to Eq. 2, the ERSRM1, ERSRM2 and DSSRM with identical housing diameters have the same MMF (Ampere-Turn) due to having the same window area. However, the ERSRM1 and the ERSRM2 (collectively, ERSRM) only has one air gap while DSSRM has two air gaps of the same distance. Therefore, higher field intensity and flux density are expected in the ERSRM over the DSSRM with the same MMF. In other words, lower excitation current is required in ERSRM than the DSSRM for the same level of flux density or saturation of ferromagnetic material. Thus, cooling and torque-per-amp performance are better for the ERSRM than the DSSRM.

According to Eq. 5 and Eq. 6, force density is determined based on magnitude of flux density and its distribution between normal and tangential directions. More particularly, Eq. 5 and Eq. 6 suggest that the minimum difference between the normal and tangential flux densities is desired in terms of reducing the normal force component and enhancing the tangential force component. Therefore, acoustic noise, which is caused by the normal force component is mitigated and motional force caused by the tangential force component is improved. Compared to standard switched reluctance motors with internal rotors, the flux pattern created by the geometry of the DSSRM and ERSRM delivers all of these advantages.

According to Eq. 10 and Eq. 11, the possibility of using a larger radius of the rotor benefits torque production. ERSRM takes best advantage of this aspect and substantially increases the torque by about a factor of about two in comparison with DSSRM.

Due to the lack of mutual coupling between each phase, torque production is modular for each current phase and fault tolerant under a phase fault condition.

Referring to FIGS. 9A-9D, a set of graphs indicate inductance (L) and current amplitude as a function of rotor angular position. Inductance, L, varies periodically with rotor position wherein a given period includes one interval in which L increases and one interval in which L decreases. It should be understood that the rotor will rotate clockwise as the currents in successive phases are energized in order phase a, phase b, phase c and then phase d. In these graphs, a positive current is applied to a given phase at an angular window where the inductance is increasing.

Figure 9A:
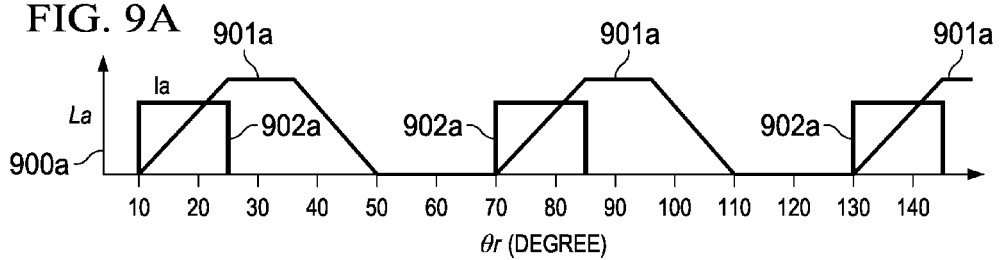
FIGS. 9A-9D are graphs of the magnetic inductance and excitation current for each phase of a preferred embodiment.

Referring to FIG. 9A, the graph 900a plots the magnetic inductance 901a (L) in the vicinity of the winding segments associated with phase a. The current amplitude 902a for phase a is plotted.

Figure 9B:
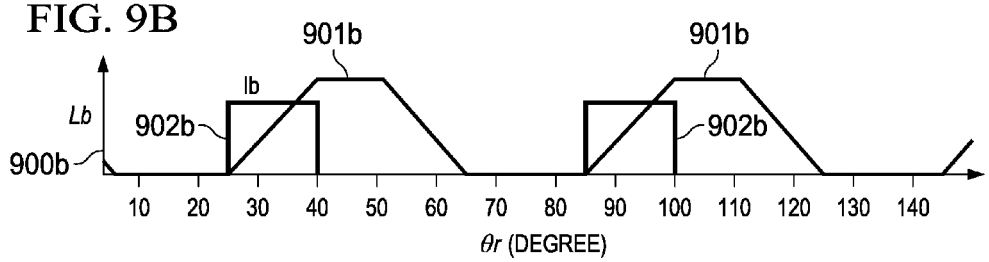

Referring to FIG. 9B, the graph 900b plots the magnetic inductance 901b (L) in the vicinity of the winding segments associated with phase b. The current amplitude 902b for phase b is plotted.

Figure 9C:
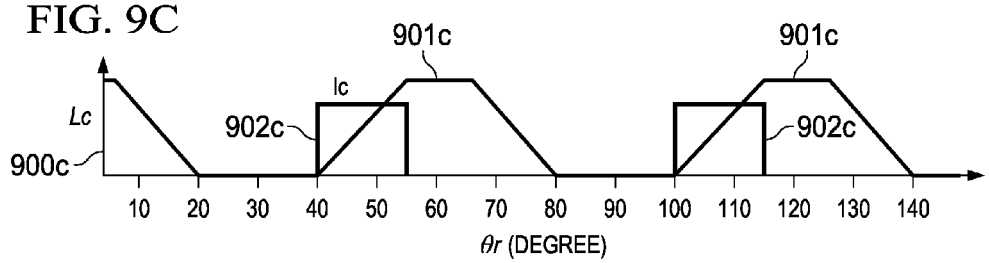

Referring to FIG. 9C, the graph 900c plots the magnetic inductance 901c (L) in the vicinity of the winding segments associated with phase c. The current amplitude 902c for phase c is plotted.

Figure 9D:
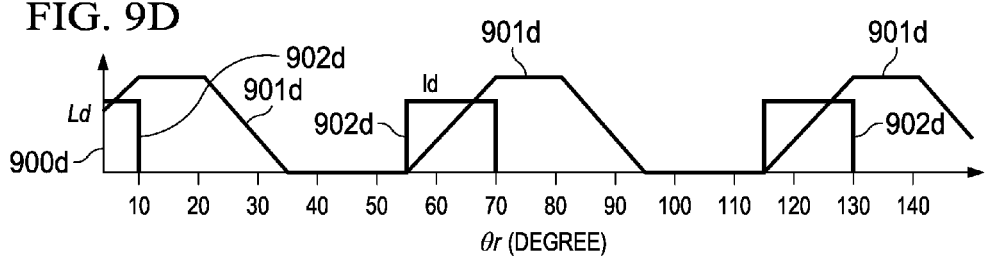

Referring to FIG. 9D, the graph 900d plots the magnetic inductance 901d (L) in the vicinity of the winding segments associated with phase d. The current amplitude 902d for phase d is plotted.

FIGS. 9A-9D, collectively, show that the phases a, b, c, and d are to be successively excited in order to operate an exterior rotor switched reluctance motor. This can be accomplished by driving the circuit of FIG. 5 with appropriate logic.

An example set of parameters for an exterior rotor switched reluctance machine is provided in Table 1.

TABLE 1

Parameters of Exterior Rotor Switched reluctance machine

| Parameter | Value |
| --- | --- |
| Number of stator poles | 8 |
| Number of rotor poles (segments) | 6 |
| Number of phases | 4 |
| Outer radius of exterior rotor | 72.0 mm |
| Outer radius of stator | 62.0 mm |
| Rotor segment thickness | 9.0 mm |
| Air gap | 1.0 mm |
| Stack length | 115.0 mm |
| Arc of the rotor segments | 47 degrees |
| Number of turns per phase | 50 |
| Rated current | 30 A |
| Rated voltage | 100 V |
| Resistance per phase | 0.78 Ω |
| Stator winding material | Copper |
| Lamination material | M19 |
| Mass of copper | 3.1 kg |
| Mass of iron | 5.0 kg |

Figure 10:
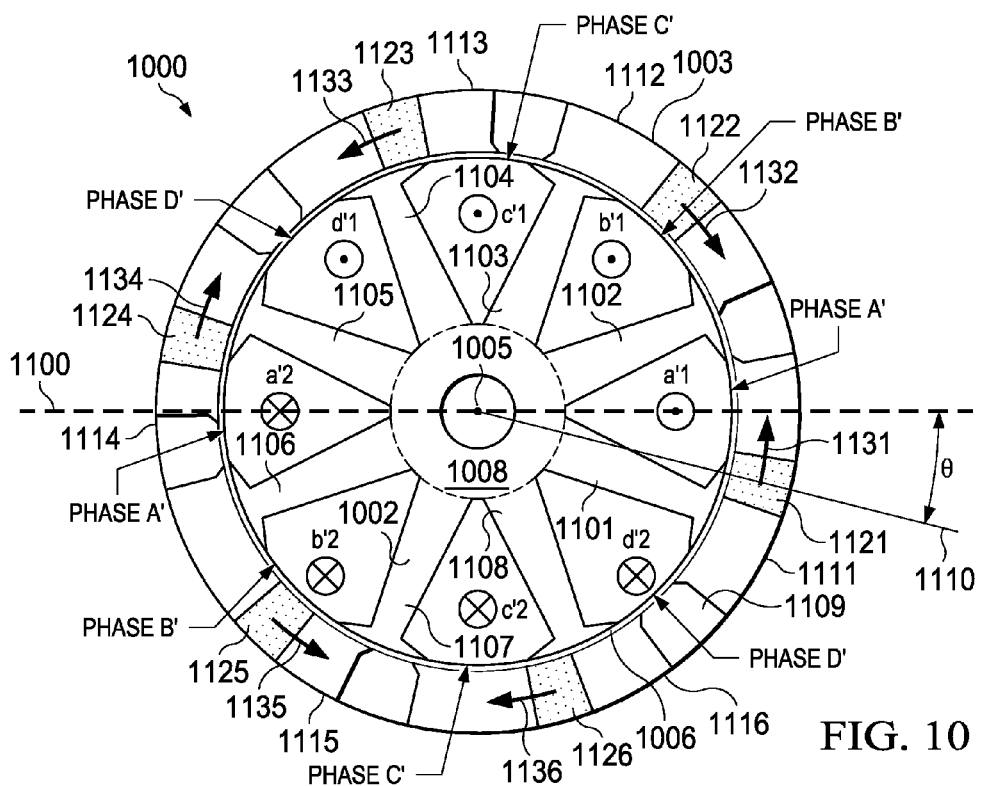
FIG. 10 is a cross-sectional view of an 8/6 configuration of a preferred embodiment with permanent magnets included in an exterior rotor.

FIGS. 10-14 show another embodiment of a stator and rotor configuration for exterior rotor switched reluctance machine 100 which utilizes a set of permanent magnets in the rotor. Referring to FIG. 10, stator and rotor configuration 1000 includes stator 1002 and rotor 1003 which are concentrically aligned with cylindrical axis 1005. Air gap 1006 separates the outer surface of stator 1002 from the inner surface of rotor 1003.

Rotor 1003 includes rotor segments 1111, 1112, 1113, 1114, 1115, and 1116 attached to rotor cage 1109 and evenly spaced with respect to each other along rotor cage 1109 which separates the rotor segments by a set of gaps. Rotor segment 1111 includes a permanent magnet 1121 centered within and having a polarity 1131. Rotor segment 1112 includes a permanent magnet 1122 centered within and having a polarity 1132. Rotor segment 1113 includes a permanent magnet 1123 centered within and having a polarity 1133. Rotor segment 1114 includes a permanent magnet 1124 centered within and having a polarity 1134. Rotor segment 1115 includes a permanent magnet 1125 centered within and having a polarity 1135. Rotor segment 1116 includes a permanent magnet 1126 centered within and having a polarity 1136.

Stator 1002 includes back iron 1008 and stator poles 1101, 1102, 1103, 1104, 1105, 1106, 1107, and 1108 spaced at equal intervals with respect to each other, each connected to and radially extending from back iron 1008. Stator 1002 further includes a set of windings including windings $a'_1$, $a'_2$, $b'_1$, $b'_2$, $c'_1$, $c'_2$, $d'_1$ and $d'_2$ which are disposed predominantly parallel to the cylindrical axis.

Windings $a'_1$ are disposed between stator poles 1101 and 1102. Windings $b'_1$ are disposed between stator poles 1102 and 1103. Windings $c'_1$ are disposed between stator poles 1103 and 1104. Windings $d'_1$ are disposed between stator poles 1104 and 1105. Windings $a'_2$ are disposed between stator poles 1105 and 1106. Windings b'$_2$ are disposed between stator poles 1106 and 1107. Windings c'$_2$ are disposed between stator poles 1107 and 1108. Windings d'$_2$ are disposed between stator poles 1108 and 1101.

The illustrated arrow heads (dots) and arrow tails (Xs) indicate the direction of current flow through the windings when the winding is energized during operation: a dot meaning that the current is flowing along the cylindrical axis towards the front axial end, an X meaning that the current is flowing along the cylindrical axis towards the rear axial end. Windings a'$_1$ and a'$_2$ are energized together as phase a', windings b'$_1$ and b'$_2$ are energized together as phase b', windings c'$_1$ and c'$_2$ are energized together as phase c' and windings d'$_1$ and d'$_2$ are energized together as phase d'.

In this embodiment, the windings corresponding to each phase are connected in series: windings a'$_1$ and a'$_2$ are connected in series, windings b'$_1$ and b'$_2$ are connected in series, windings c'$_1$ and c'$_2$ are connected in series, and, windings d'$_1$ and d'$_2$ are connected in series. Also, the windings corresponding to a given phase are electrically isolated from the other windings: windings a'$_1$ and a'$_2$ are electrically isolated from windings b'$_1$, b'$_2$, c'$_1$, c'$_2$, d'$_1$ and d'$_2$; windings b'$_1$ and b'$_2$ are electrically isolated from windings a'$_1$, a'$_2$, c'$_1$, c'$_2$, d'$_1$ and d'$_2$ and so on.

A radial stator axis 1100 is defined to be along the central axis between two opposing stator poles, stator pole 1101 and stator pole 1102, and through the center of windings a'$_1$ and a'$_2$. A radial rotor axis 1110 is defined to be along a radial axis extending perpendicular from the cylindrical axis through the center of permanent magnet 1121 which is in rotor segment 1111. The position of the rotor is defined for this embodiment as the angle between the radial rotor axis 1110 and the radial stator axis 1100 measured positively in the clockwise direction.

In a preferred embodiment, shown by example of FIG. 10, stator and rotor configuration is an 8/6 configuration, i.e., eight stator poles and six rotor segments with six permanent magnets spaced at even angular intervals. In another embodiment, the stator and rotor configuration is a 6/4 configuration. In another embodiment, stator and rotor configuration is a 10/8 configuration. In another embodiment, the stator and rotor configuration is a 12/8 configuration. In another embodiment, the stator and rotor configuration is a 16/12 configuration. Other configurations may be easily conceived and the invention is not intended to be limited by the disclosed configurations.

In a preferred embodiment, rotor segments 1111, 1112, 1113, 1114, 1115, and 1116 are positioned at intervals of 60° on center with respect to each other. In other stator and rotor configurations, other intervals are employed.

In a preferred embodiment, stator poles 1101, 1102, 1103, 1104, 1105, 1106, 1107, and 1108 are positioned at intervals of 22.5° with respect to each other. In other stator and rotor configurations, other intervals are employed.

In a preferred embodiment, each of stator poles 1101, 1102, 1103, 1104, 1105, 1106, 1107, and 1108 have an arc length of approximately 25° at air gap 1006. In other stator and rotor configurations, other arc lengths are employed.

In a preferred embodiment, stator 1102 is made of M-19 laminated electric silicon steel. In other embodiments, other grades of laminated electric silicon steel not exceeding M-49 may be employed.

In a preferred embodiment, each of rotor segments 1111, 1112, 1113, 1114, 1115, and 1116 is made of M-19 laminated electric silicon steel. In other embodiments, other grades of laminated electric silicon steel not exceeding M-49 may be employed.

In a preferred embodiment, each of permanent magnets 1121, 1122, 1123, 1124, 1125, and 1126 is a rare earth magnet having a relative permeability approximately close to that of air with a relative permeability of approximately 1.00000037. In one embodiment, each of the permanent magnets 1121, 1122, 1123, 1124, 1125, and 1126 is made of a neodymium alloy having a relative permeability of approximately 1.05. In another embodiment, each of the permanent magnets 1121, 1122, 1123, 1124, 1125, and 1126 is made of a samarium cobalt alloy having a relative permeability of approximately 1.05.

In a preferred embodiment, windings a'$_1$, and a'$_2$, b'$_1$, and b'$_2$, c'$_1$, and c'$_2$, d'$_1$ and d'$_2$ are made of copper. Other suitable conductive materials known in the art may be employed.

In a preferred embodiment, air gap 1006 is approximately 1.0 mm.

Referring to FIG. 11, circuit 1150 drives exterior rotor switched reluctance machine 100 with stator and rotor configuration 1000. Circuit 1150 comprises bridge converters 1151, 1152, 1153, and 1154 controlling phases a, b, c, and d, respectively. Bridge converters 1151, 1152, 1153, and 1154 are connected in parallel to power source 1155.

In a preferred embodiment, each of bridge converters 1151, 1152, 1153, and 1154 is a full bridge converter providing both positive and negative current.

In another embodiment, each of bridge converters 1151, 1152, 1153, and 1154 is a half bridge converter, each having independent control of each phase current magnitude and direction (see FIG. 5).

In use, torque is generated by the exterior rotor switched reluctance machine through selectively energizing the windings disposed between the stator poles of phases a, b, c, and d with current using circuit 1150, thereby causing rotor 1003 to rotate with respect to stator 1002. The energizing of the windings disposed between the stator poles of stator 1002 for each phase is synchronized with the rotor position of rotor 1003.

The theory of operation for exterior rotor switched reluctance machine 100 with stator and rotor configuration 1000 is as follows. For each given phase, the terminal voltage is defined by:

$$V_a = Ri_a + E_a = Ri_a + \frac{d\phi_a}{dt} \qquad \text{Eq. 12}$$

where, R is the resistance for the given phase, $i_a$ is current for the given phase, $E_a$ is the induced back EMF for the given phase, and $\phi_a$ is the flux linkage for the given phase. The flux linkage $\phi_a$ for the given phase is defined as:

$$\phi_a = L_{aa}(\theta_r)i_a + \psi_{pm\_a}(\theta_r) + M_{ab}(\theta_r)i_b + M_{ac}(\theta_r)i_c + M_{ad}(\theta_r)i_d \qquad \text{Eq. 13}$$

where $L_{aa}$ is the self inductance in the given phase, $\psi_{pm}$ is the flux linkage caused by the permanent magnet, $M_{ab}$, $M_{ac}$, $M_{ad}$ are the mutual inductances between the phases $i_a$, $i_b$, $i_c$, $i_d$ are the phase currents for phases a, b, c, d, respectively, and $\theta_r$ is the angular position of the rotor for the given phase. Because the mutual inductance between each phase is an order of magnitude smaller than the self inductance, the interaction between each phase is neglected resulting in the flux linkage for the given phase defined as:

$$\phi_a = L_{aa}(\theta_r)i_a + \psi_{pm\_a}(\theta_r) \qquad \text{Eq. 14}$$

As a result, the induced back EMF for the given phase is defined as:

$$E_a = \frac{dL_{aa}(\theta r)i_a}{dt} + \frac{d\psi_{pm\_a}(\theta_r)}{dt} \qquad \text{Eq. 15}$$

$$= i_a \frac{dL_{aa}(\theta r)}{dt} + \frac{dL_{aa}(\theta_r)i_a}{dt} + \frac{d\psi_{pm\_a}(\theta_r)}{dt}$$

$$= i_a \frac{dL_{aa}(\theta_r)}{d\theta_r}\omega_r + L_{aa}(\theta_r)\frac{di_a}{dt} + \frac{d\psi_{pm\_a}(\theta_r)}{d\theta r}\omega_r$$

Using Eq. 15, the electromagnetic power for the given phase is defined by:

$$P = i_a E_a \qquad \text{Eq. 16}$$

$$= i_a\left(i_a \frac{dL_{aa}(\theta_r)}{d\theta r}\omega_r + L_{aa}(\theta_r)\frac{di_a}{dt} + \frac{d\psi_{pm\_a}(\theta_r)}{d\theta r}\omega_r\right)$$

$$= i_a^2 \frac{dL_{aa}(\theta_r)}{d\theta r}\omega_r + i_a L_{aa}(\theta_r)\frac{di_a}{dt} + i_a\frac{d\psi_{pm\_a}(\theta_r)}{d\theta r}\omega_r$$

$$= \frac{1}{2}\left(i_a^2\frac{dL_{aa}(\theta_r)}{d\theta_r}\omega_r + i_a^2\frac{dL_{aa}(\theta_r)}{dt} + 2i_a L_{aa}(\theta_r)\frac{di_a}{dt}\right) +$$

$$i_a \frac{d\psi_{pm\_a}(\theta_r)}{d\theta r}\omega_r$$

$$= \frac{d\left(\frac{1}{2}L_{aa}(\theta_r)i_a^2\right)}{dt} + \left(\frac{1}{2}i_a^2\frac{dL_{aa}(\theta_r)}{d\theta_r} + i_a\frac{d\psi_{pm\_a}(\theta_r)}{d\theta r}\right)\omega_r$$

where $\omega_r$ is the angular frequency of the rotor, and $$\frac{d\left(\frac{1}{2}L_{aa}(\theta_r)i_a^2\right)}{dt}$$

in Eq. 16 is the reactive power because $$\frac{d\left(\frac{1}{2}L_{aa}(\theta_r)i_a^2\right)}{dt}$$

refers to variation of the energy stored in the field. Ideally, the reactive power is not consumed by the exterior rotor switched reluctance machine, but cycles between the power supply and the exterior rotor switched reluctance machine. The second term, $$\left(\frac{1}{2}i_a^2\frac{dL_{aa}(\theta_r)}{d\theta_r} + i_a\frac{d\psi_{pm\_a}(\theta_r)}{d\theta r}\right)\omega_r,$$

is the active power converted to mechanical energy. Dividing the active power by the angular frequency of the rotor, the torque for the given phase is defined by:

$$T = \frac{1}{2}i_a^2\frac{dL_{aa}(\theta_r)}{d\theta_r} + i_a\frac{d\psi_{pm\_a}(\theta_r)}{d\theta r} \qquad \text{Eq. 17}$$

The total torque generated by the exterior rotor switched reluctance machine includes two sources of torque: reluctance torque, $$\frac{1}{2}i_a^2\frac{dL_{aa}(\theta_r)}{d\theta_r},$$

and reactance torque, $$i_a\frac{d\psi_{pm\_a}(\theta_r)}{d\theta r}.$$

These two sources of torque can be either additive or subtractive depending on the operation mode.

The reluctance torque is determined by the magnitude of the current and the inductance variation over rotor position. The direction of the reluctance torque is determined only by the derivative of inductance over rotor position.

The reactance torque direction depends on the flux linkage variation and the current direction. The reactance torque magnitude is linearly related to the current magnitude and the flux variation of the permanent magnet provided that no saturation is present. If the flux linkage derivative is positive, positive applied current will result in clockwise torque. If the flux linkage derivative is negative, negative applied current will also result in clockwise torque. Thus, clockwise reactance torque can be generated regardless of inductance slope over the entire electrical cycle.

In a preferred embodiment, the average reactance torque is approximately three times the average reluctance torque where the averages are taken over a complete motor rotation. In additional embodiments the average reactance torque is more than three times the average reluctance torque.

Figure 12:
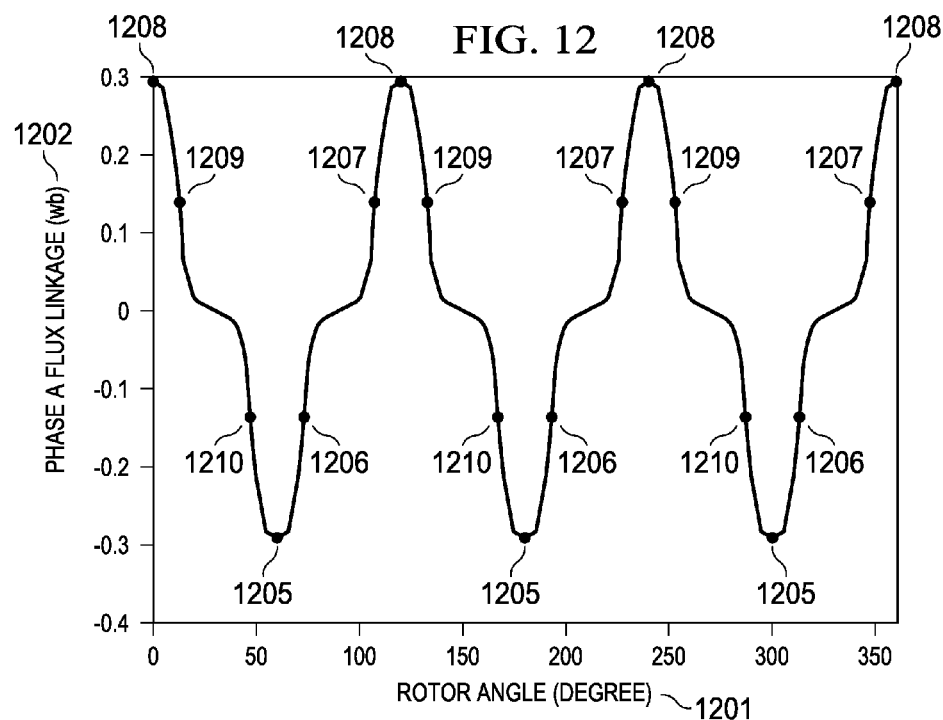
FIG. 12 is a graph of flux linkage versus rotor position for a preferred embodiment with permanent magnets included in an exterior rotor.

Referring to FIG. 12, by way of example, the flux linkage 1202 versus the position of rotor 1201 for a given phase is shown. In this embodiment, a positive current is applied to the windings of the given phase as the flux linkage is increasing from points 1205 through points 1206 and 1207, until the flux linkage peaks at points 1208. A negative current is applied to the windings of the given phase as the flux linkage is decreasing from points 1208 through points 1209 and 1210 to points 1205. The portion of the graph from points 1205 increasing to points 1208 represents a clockwise reluctance torque and clockwise reactance torque regardless of the direction of applied current. The flux linkage peaks at points 1208 and decreases through points 1209 and 1210 until the flux linkage reaches minimum values at points 1205. The portion of the graph from points 1208 to points 1205 represents a counterclockwise reluctance torque and clockwise reactance torque regardless of the direction of the applied current. During a full period, the net reluctance torque is approximately zero and contributes only to torque ripple.

In an alternate embodiment, also with permanent magnets in the rotor, positive current is only applied to the windings of the given phase as the flux linkage increases. In this embodiment, positive current is applied to the windings of the given phase as the flux linkage increases from points 1205 through points 1206 and 1207, until the flux linkage peaks at points 1208. The portion of the graph from points 1205 increasing to points 1208 represents a clockwise reluctance torque and a clockwise reactance torque. As the flux linkage peaks at point 1208 and decreases through points 1209 and 1210 to point 1205, no current is applied to the windings of the given phase so no torque is developed. During a full period, in the alternate embodiment, the net reluctance torque is clockwise and contributes to overall clockwise torque.

Figure 13:
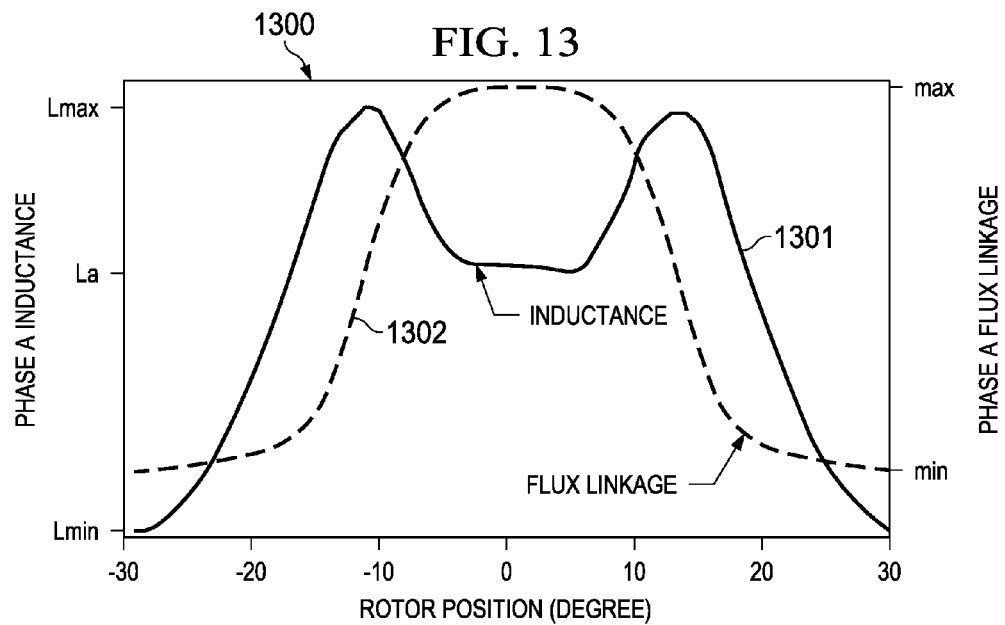
FIG. 13 is a graph depicting the flux linkage and the inductance versus rotor position for a particular current phase of a preferred embodiment with permanent magnets included in an exterior rotor.

Referring to FIG. 13, flux linkage profile 1301 and inductance profile 1302 of phase a' are overlaid as two plots in graph 1300 which plots the profiles between the rotational positions of −30° to 30°. Phases b', c' and d' have the same waveform of inductance profile over rotor position with a fixed angle shift between each phase. Flux linkage profile 1301 is the same as the flux linkage profile plotted in FIG. 12, viewed over a narrow window of rotational positions.

As for the inductance profile 1302, there is an inductance dip when the permanent magnet aligns with the center of the phase a' windings at 0°. Initially when the rotor moves from a completely unaligned position near −30° to where first half of rotor segment aligns with the stator at about −12°, the inductance increases. Since the permanent magnet material has a relative permeability very close to air, the equivalent airgap length will increase until about −5° after which it remains constant, the inductance decreasing to a minimum at about −5° where the permanent magnet is between stator poles. The equivalent airgap length remains constant and the inductance remains constant between about −5° and +5°. The inductance increases to the maximum value at about 12° since the second half of rotor segment is fully aligned with stator at about +12°. Finally, the inductance will decrease again when the second half of rotor segment rotates away from the aligned position, towards +30°.

Figure 14:
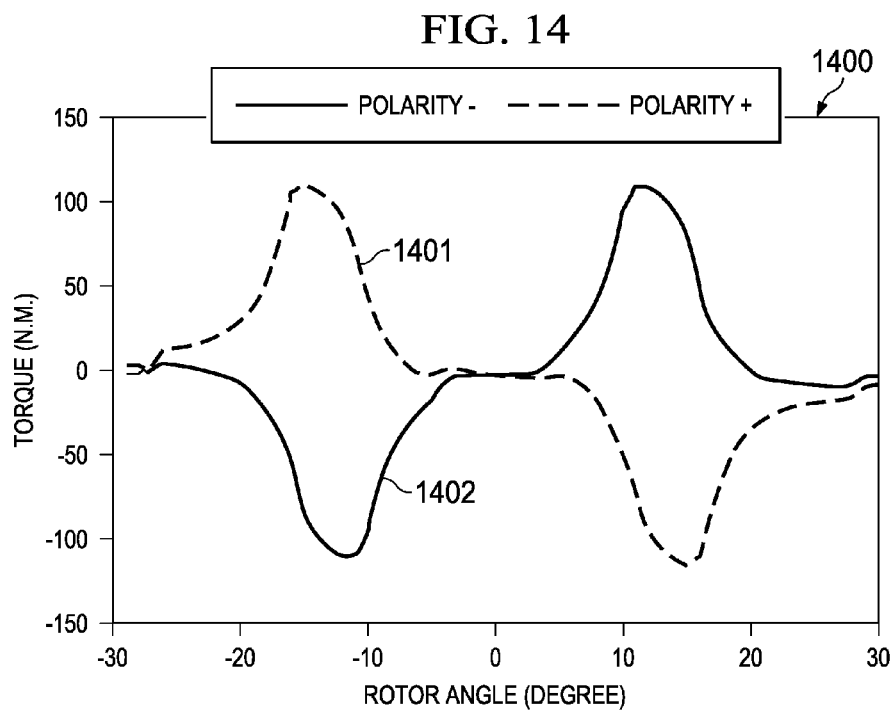
FIG. 14 is a graph of torque versus rotor position for two opposing current polarities applied to a particular current phase for a preferred embodiment with permanent magnets included in an exterior rotor.

Referring to FIG. 14, a graph 1400 of torque versus rotational position is provided for the exterior rotor switched reluctance machine with a permanent magnet. Two curves are shown: curve 1401 is the torque profile produced by a first applied current and curve 1402 is the torque profile produced by a second applied current with an opposite polarity to the first applied current. The torque is only plotted for rotational positions between −30° and +30°. The profiles shown are periodically repeated every 60° throughout the remainder of the rotational positions.

FIG. 14 indicates that when positive torque is desired, the machine can be excited by an appropriate polarity of current for half of the electrical cycle. However, by switching the polarity of the current at −30°, 0°, +30° and so forth, positive torque can be generated in the entire electrical cycle. This effectively boosts the torque generated by a factor of two.

Referring to FIGS. 15A-15D, in a preferred embodiment with permanent magnets in the rotor, a preferred current sequence in relation to the flux linkage for each phase of exterior rotor switched reluctance machine is shown.

Figure 15A:
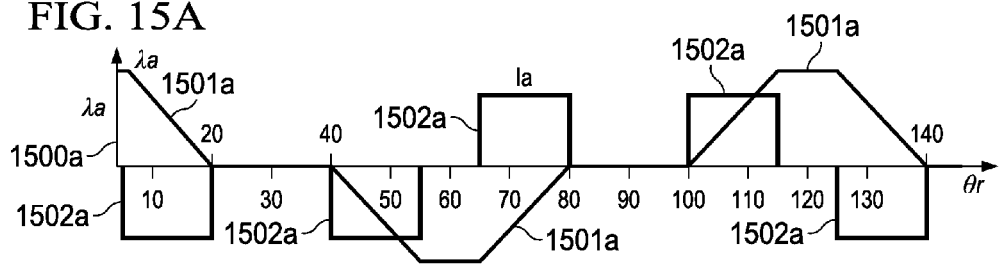
FIGS. 15A-15D are graphs of the magnetic inductance and excitation current for each phase of a preferred embodiment with permanent magnets included in an exterior rotor.

Referring to FIG. 15A, the graph 1500a plots the flux linkage 1501a ($\lambda_a$) in the vicinity of the winding segments associated with phase a. The current amplitude 1502a for phase a is plotted.

Figure 15B:
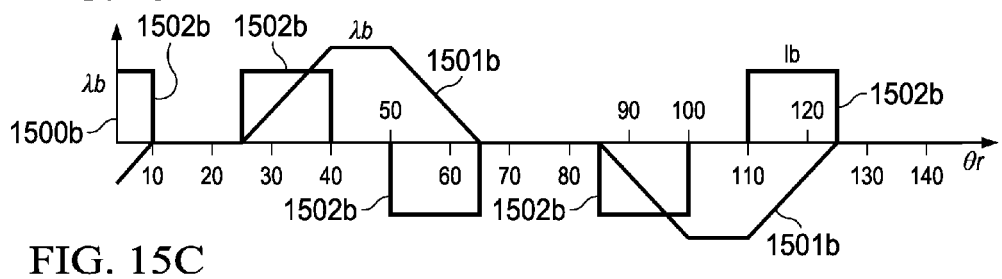

Referring to FIG. 15B, the graph 1500b plots the flux linkage 1501b ($\lambda_b$) in the vicinity of the winding segments associated with phase b. The current amplitude 1502b for phase b is plotted.

Figure 15C:
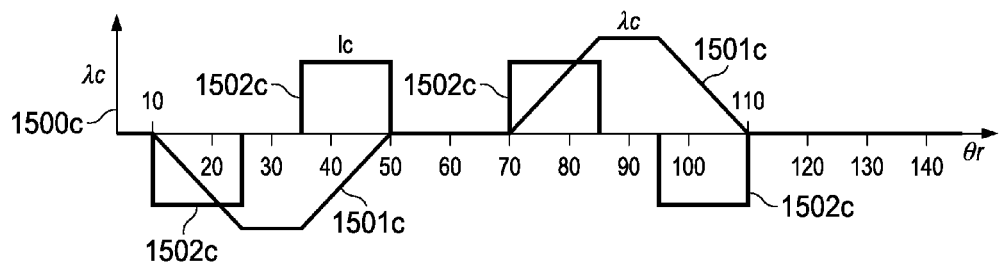

Referring to FIG. 15C, the graph 1500c plots the flux linkage 1501c ($\lambda_c$) in the vicinity of the winding segments associated with phase c. The current amplitude 1502c for phase c is plotted.

Figure 15D:
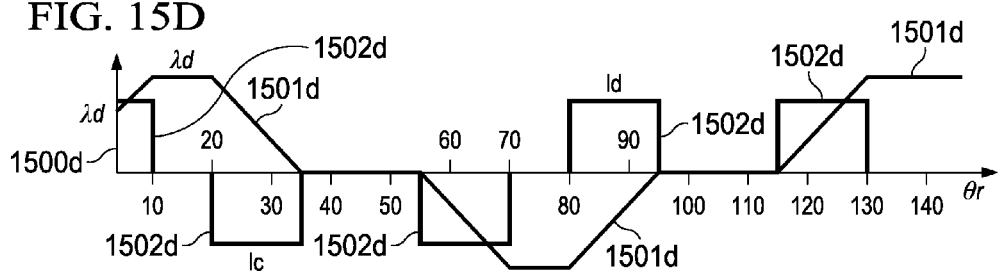

Referring to FIG. 15D, the graph 1500d plots the flux linkage 1501d ($\lambda_d$) in the vicinity of the winding segments associated with phase d. The current amplitude 1502d for phase d is plotted.

In this preferred embodiment, as the flux linkage is increasing for each phase, a positive current is applied to the respective phase windings. For each phase, as the flux linkage is decreasing a negative current is applied to the respective phase windings. When the flux linkage plateaus for each phase, no current is applied to the respective phase windings.

Figure 15E:
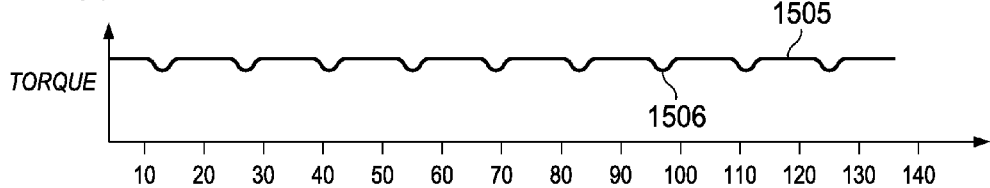
FIG. 15E is a graph of overall torque versus rotor position for a preferred embodiment with permanent magnets included in an exterior rotor.

Referring to FIG. 15E, when all phases are excited as shown in FIGS. 15A-15D, an overall clockwise torque 1505 develops that includes a torque ripple 1506 due to reluctance torque.

In an alternate embodiment, only a positive current is applied to the phase windings as the flux linkage is increasing for the respective phase. No negative current is applied. In this embodiment, current amplitudes 1502a, 1502b, 1502c and 1502d, will only have a positive component.

In a generator embodiment, wherein the rotor includes a set of permanent magnets, the exterior rotor switched reluctance machine is operated as a generator, in which case external torque is to be applied. When operated as a generator, a given phase produces a positive and a negative current pulse while the rotor segments nearest the windings to be energized are brought into an aligned position or shortly thereafter. The given phase may then be unexcited, i.e., the windings corresponding to the phase may be switched off, just before the rotor segments reach a fully unaligned position relative to the stator poles surrounding the given phase. In another embodiment, the windings corresponding to the phase are switched so as to produce current of a single polarity.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A switched reluctance machine comprising:
   a stator further comprising a back iron and a set of stator poles connected to the back iron;
   a rotor, adjacent the stator, rotatively coupled to the stator and connected to a shaft;
   the rotor further comprising a set of rotor segments;
   a housing connected to the stator and adjacent the rotor;
   a set of stator windings alternately disposed between the set of stator poles;
   a set of phases, each phase comprising a subset of the set of stator windings;
   whereby selectively energizing the set of phases with a set of current pulses rotates the rotor with respect to the stator and the housing;
   a first rotor segment of the rotor segments including a first permanent magnet with a polarity that is substantially tangential to a direction of motion the rotor;
   a circuit configured to provide:
     a first current pulse of the set of current pulses of a first phase of the set of phases;
     a second current pulse of the set of current pulses of the first phase of the set of phases;
     a third current pulse of the set of current pulses of the first phase of the set of phases;
     a fourth current pulse of the set of current pulses of the first phase of the set of phases;
     the first current pulse followed by the second current pulse followed by the third current pulse followed by a fourth current pulse;
     the first current pulse and the fourth current pulse each having a same polarity; and,
     the second current pulse and the third current pulse having a same polarity that is opposite the polarity of the first current pulse and the third current pulse.

2. The switched reluctance machine of claim 1, wherein the circuit is further configured to provide:
  the second current pulse ending about 40 degrees of rotor rotation after a start of the first current pulse;
  the third current pulse starting about 20 degrees of rotor rotation after an ending of the second current pulse;
  the fourth current pulse ending about 40 degrees of rotor rotation after a start of the third current pulse; and,
  the first current pulse, the second current pulse, the third current pulse, and the fourth current pulse to each last about 15 degrees of rotor rotation.

3. The switched reluctance machine of claim 2, wherein the circuit is further configured to provide:
  a fifth current pulse of the set of current pulses of the first phase of the set of phases that has a same polarity as the first current pulse and the fourth current pulse and follows the fourth current pulse;
  a start of the fifth current pulse separated from a start of the first current pulse by a rotor rotation of about 120 degrees; and,
  a start of the fifth current pulse separated from an end of the fourth current pulse by a rotor rotation of about 20 degrees.

4. A switched reluctance machine comprising:
  a stator further comprising a back iron and a set of stator poles connected to the back iron;
  a rotor, adjacent the stator, rotatively coupled to the stator and connected to a shaft;
  the rotor further comprising a set of rotor segments;
  a housing connected to the stator and adjacent the rotor;
  a set of stator windings alternately disposed between the set of stator poles;
  a set of phases, each phase comprising a subset of the set of stator windings;
  whereby selectively energizing the set of phases with a set of current pulses rotates the rotor with respect to the stator and the housing;
  a first rotor segment of the rotor segments including a first permanent magnet with a polarity that is substantially tangential to a direction of motion the rotor;
  the set of phases including the first phase, a second phase, as third phase, and a fourth phase;
  wherein the set of current pulses include a set of current pulses for the first phase, a set of current pulses for the second phase, a set of current pulses for the third phase, and a set of current pulses for the fourth phase;
  the circuit further configured to provide:
    the set of current pulses for the second phase offset from the set of current pulses of the first phase by about 15 degrees of rotor rotation and are of an opposite polarity with respect to the set of current pulses of the first phase;
    the set of current pulses for the third phase that are offset from the set of current pulses of the second phase by about 15 degrees of rotor rotation and are of an opposite polarity with respect to the set of current pulses of the second phase; and,
    the set of current pulses for the fourth phase that are offset from the set of current pulses of the third phase by about 15 degrees of rotor rotation and are of an opposite polarity with respect to the set of current pulses of the third phase.

* * * * *